Jan. 19, 1965   B. T. HULSE ETAL   3,166,149
DAMPED-RESONATOR ACOUSTICAL PANELS
Filed Nov. 29, 1963

INVENTORS
BRUCE T. HULSE
MILTON W. JETER
BY
AGENT

3,166,149
DAMPED-RESONATOR ACOUSTICAL PANELS
Bruce T. Hulse, Renton, and Milton W. Jeter, Bellevue, Wash., assignors to The Boeing Company, Seattle, Wash., a corporation of Delaware
Filed Nov. 29, 1963, Ser. No. 326,904
5 Claims. (Cl. 181—33)

This invention relates to a new and improved damped-resonator sound absorption panel and more particularly to a damped-resonator acoustical panel having several laminated sheets, at least one of said sheets being primarily structural.

The use of a perforated layer, a porous layer, and air layer, and a hard surface serially composited to introduce a Helmholtz resonance into an acoustical panel absorption system is well known in the prior art. This type of damped-resonator panel may employ a cellular core layer between the porous and hard surfaced layers to partition the air layer into a multiplicity of separate cells. However, panels built to this design are apt to be structurally deficient for various applications.

Accordingly, it is the object of the present invention to provide an acoustical panel having a honeycomb or cellular core layer separating a perforated sheet from a hard surfaced or solid sheet, and having a stressed-skin bonded directly to one surface of the honeycomb layer.

Another object of this invention is to provide an acoustical panel having a honeycombed layer with a hard surfaced sheet bonded to one side of the honeycomb, an open-weave fiberglass screen bonded to the opposite surface and a porous cloth or fabric layer bonded to the open-weave screen.

A further object of this invention is to provide an acoustical panel having a facing surface which is readily adaptable to various decorative designs and produces no substantial eye fatigue to persons viewing nearby panels due to perforations in the facing surface.

A still further object of this invention is to provide an acoustical panel in which the decorative surface layer can be easily maintained or replaced if damaged without destroying the basic structural panel.

An additional object of this invention is to provide an acoustical panel having sufficient structural rigidity and strength to permit use of the panel for self-supporting doors, partitions and flat or curved ceiling panels which may be subjected to lateral forces.

The drawing diagrammatically illustrates by way of example, not by way of limitation, one form of the invention which comprises several novel features hereinafter set forth wherein like reference numerals designate corresponding parts in the several views in which.

Figure 1:
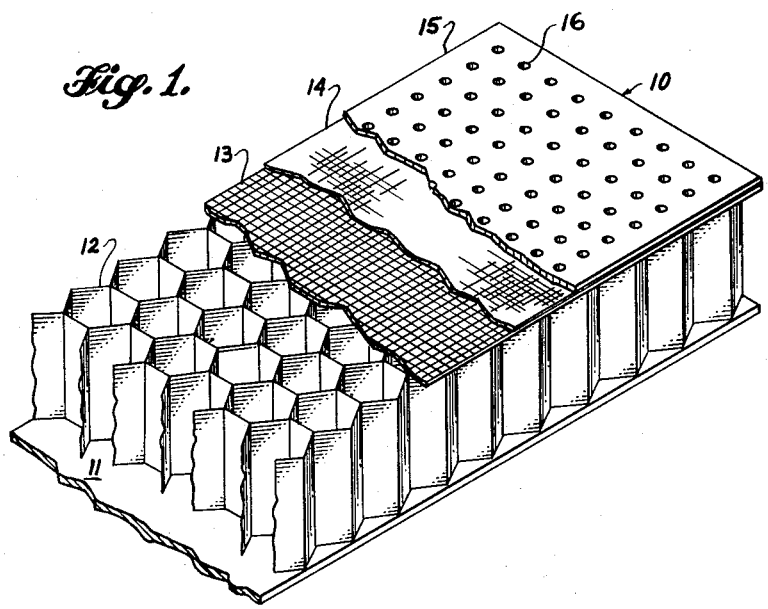
FIG. 1 is a perspective view of a damped-resonator acoustical panel.

Referring now to FIG. 1 there is shown a damped-resonator acoustical panel 10. The panel 10 comprises a hard surfaced, substantially air impervious, sound reflecting solid layer 11. This layer 11 is the most distant layer from the source of the sound waves to be damped. The hard wall or layer 11 yields a high backing impedance and also structural rigidity. The layer 11 is bonded to a honeycomb or cellular core layer 12. The thickness of the honeycomb layer, having individual cells extending throughout the thickness, serves structurally to separate the solid layer 11 from a fiberglass screen 13. Additionally, the thickness of honeycomb 12 is also acoustically critical since it determines the impedance of the air layer as well as the frequency range of sound absorption. Independent of the above acoustical effects of the honeycomb layer is the effect of partitioning the air layer between screen 13 and solid layer 11 which appreciably increases the absorption efficiency for sound waves which are not normal to the panel 10. Depending on the use of the panel 10, the honyecomb layer material may be paper, metal, fiberglass or some suitable structural material.

Bonded to the layer 12 is a plastic impregnated open-weave fiberglass net or screen 13. Curing the plastic impregnated screen prior to bonding provides a rigid sheet. Bonding screen 13 and solid layer 11 to the honeycomb layer 12 provides a composite layer which has substantial structural rigidity. The two sheets 11 and 13 which serve as stressed-skins when bonded to honeycomb 12 provide flexural rigidity against laterally directed forces. Considering the composite layer structurally, it may be seen that a normal force applied to the solid layer 11 will produce compressive stress in layer 11 and tensile stress in screen 13. The screen 13, therefore, could be any flexible material since only tension forces are assumed by this sheet. However, if normal loads are applied against the screen 13 the solid layer 11 is put in tension while the screen 13 assumes compressive forces. It is thus apparent that a flexible material used as screen 13, which could not provide compressive strength, would result in lesser flexural rigidity than if the screen 13 was rigid. The screen or sheet 13 in this invention provides the necessary rigidity and strength by its ability to withstand compressive loading when used as a stressed-skin in the composite layer while simultaneously providing fluid communication between the honeycomb cells and the external medium. The increased strength of the composite layer withstands the application of substantial laterally directed loads and results in a lightweight panel 10 which can be used when no other structural support is available, such as partitions and doors.

Figure 2:
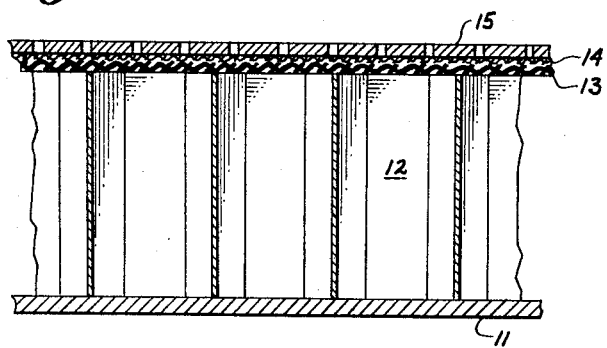
FIG. 2 is a fragmentary vertical section of the panel shown in FIG. 1.

A porous material layer 14 is bonded to the screen 13 as shown best in FIG. 2. This acoustical damping fabric produces an impedance or power loss in the sound waves directed at the panel. The impedance of porous material 14 is an inverse function of the porosity (among other factors) and the porosity found to be most effective is that which will allow 250 to 500 cubic feet per minute of air to pass through one square foot of the fabric at 0.5 inch water pressure. It is to be appreciated that the porosity of the open-weave screen 13 is considerably higher than fabric layer 14 and produces substantially no flow resistance.

The final layer of the panel 10 is a perforated decorative facing layer 15 which is bonded to the fabric layer 14, or may be integral therewith. The perforations 16 serve as a fluid communication between the honeycomb cells and the external medium. Since structural rigidity is provided by screen 13 in combination with layers 11 and 12, the decorative layer 15 may be of a flexible non-structural material. Furthermore, since the facing 15 is non-structural, it may be replaced when damaged or may be substituted by a different decorative patterned facing surface without affecting the basic structural panel. Layer 15 preferably has a hard surface which may be readily cleaned and maintained. The minimum size of the perforations 16 is that which prevents dirt or foreign particles from imbedding in the opening and thereby blocking fluid communication. The maximum size of the perforations is that which avoids visual discomfort to persons viewing the panels at relatively close range and which will not change the decorative appearance of the layer. The perforations may be of any geometric shape; but it was found that an area of approximately .0007 square inch was most consistent with the above size requirements. Effective sound absorption was found to exist when the perforations were uniformly distributed over the layer 15 and constituted 7–20% of the total area of layer 15, the minimum value being defined primarily by visual appearance criteria.

While there has been shown and described the fundamental novel features of this invention as applied to the preferred embodiment, it will be understood that various omissions and substitutions and changes in the form and details of the device illustrated may be made by those skilled in the art without departing from the spirit of the invention. It is the intention therefore to be limited only by the scope of the following claims and reasonable equivalents thereof.

We claim:

1. A laminated-resonator acoustical panel comprising in combination:
    (a) a stressed-skin flexurally rigid composite layer having two sheets and a cellular core, said cellular core positioned between said sheets and bonded thereto so that when laterally directed forces are applied to the composite layer both sheets assume tension and compression loads,
    (b) one of said sheets being a rigid open-weave screen,
    (c) the other of said sheets being a substantially air impervious sound reflecting solid layer,
    (d) a porous material layer bonded to said open-weave screen, and
    (e) a perforated decorative facing layer bonded to said porous material layer.

2. The damped-resonator acoustical panel of claim 1 wherein the rigid open-weave screen has substantially no air flow resistance.

3. The damped-resonator acoustical panel of claim 1 wherein the porous material layer has a porosity allowing between 250 and 500 cubic feet of air per minute to pass through each square foot thereof at 0.5 inch water pressure.

4. The damped-resonator acoustical panel of claim 1 wherein the perforated decorative layer has a plurality of uniformly distributed perforations of about 0.0007 square inch in area.

5. The damped-resonator acoustical panel of claim 1 wherein the decorative layer has a perforated area which constitutes from 7 to 20 percent of the total area of said layer.

References Cited by the Examiner
UNITED STATES PATENTS 2,870,857  1/59  Goldstein _____ 181—33.1
2,915,135  12/59  Lemmerman _____ 181—33.1

FOREIGN PATENTS 206,535  4/46  Australia.

OTHER REFERENCES

Publication, "Porous Material For Noise Control," by Samuel Labate, "Noise Control," vol. 2, No. 1, January 1956, pp. 15–19 and 72.

LEO SMILOW, *Primary Examiner.*